United States Patent
Zhao et al.

(10) Patent No.: US 10,642,520 B1
(45) Date of Patent: May 5, 2020

(54) MEMORY OPTIMIZED DATA SHUFFLE

(71) Applicant: EMC IP Holding Company LLC, Hopkinton, MA (US)

(72) Inventors: Junping Zhao, Beijing (CN); Kenneth J. Taylor, Franklin, MA (US); Randall Shain, Wrentham, MA (US); Kun Wang, Beijing (CN)

(73) Assignee: EMC IP Holding Company LLC, Hopkinton, CA (US)

( * ) Notice: Subject to any disclaimer, the term of this patent is extended or adjusted under 35 U.S.C. 154(b) by 263 days.

(21) Appl. No.: 15/490,430

(22) Filed: Apr. 18, 2017

(51) Int. Cl.
  *G06F 3/00* (2006.01)
  *G06F 3/06* (2006.01)

(52) U.S. Cl.
  CPC ............ *G06F 3/0638* (2013.01); *G06F 3/061* (2013.01); *G06F 3/065* (2013.01); *G06F 3/067* (2013.01); *G06F 3/0647* (2013.01); *G06F 3/0655* (2013.01); *G06F 3/0656* (2013.01); *G06F 3/0683* (2013.01)

(58) Field of Classification Search
  None
  See application file for complete search history.

(56) References Cited

U.S. PATENT DOCUMENTS

| 2015/0193342 A1* | 7/2015 | Ohara | G06F 12/0873 711/120 |
| 2018/0293028 A1* | 10/2018 | Abali | H03M 7/30 |
| 2018/0307420 A1* | 10/2018 | Yoon | G06F 11/108 |

OTHER PUBLICATIONS

Zhengzhou Yunhai Information Technology [INEI], "Non-volatile memory based coherency bus expansion system, has dynamic random-access memory unit and non-volatile memory unit global cache coherence . . . ", Feb. 14, 2017; Derwent 2017-423843, Abstract (Year: 2017).* stackoverflow.com, "Join the Stack Overflow Community: What is the Purpose of Shuffling and Sorting Phase in the Reducer in Map Reduce Programming?" http://stackoverflow.com/questions/22141631/what-is-the-purpose-of-shuffling-and-sorting-phase-in-the-reducer-in-map-reduce, Aug. 18, 2016, 4 pages.

R. Xin, "Apache Spark the Fastest Open Source Engine for Sorting a Petabyte," https://databricks.com/blog/2014/10/10/spark-petabyte-sort.html, Oct. 10, 2014, 4 pages.

(Continued)

*Primary Examiner* — Midys Rojas
(74) *Attorney, Agent, or Firm* — Ryan, Mason & Lewis, LLP (57) ABSTRACT

In a distributed data processing system with a set of multiple nodes, a first data shuffle memory pool is maintained at a data shuffle writer node, and a second data shuffle memory pool is maintained at a data shuffle reader node. The data shuffle writer node and the data shuffle reader node are part of the set of multiple nodes of the distributed data processing system. In-memory compression is performed on at least a portion of a data set from the first data shuffle memory pool. At least a portion of the compressed data is transmitted from the first data shuffle memory pool to the second data shuffle memory pool in a peer-to-peer manner. Each of the first data shuffle memory pool and the second data shuffle memory pool may include a hybrid memory configuration.

20 Claims, 10 Drawing Sheets

(56) References Cited

OTHER PUBLICATIONS

R. Xin, "Recent Performance Improvements in Apache Spark: SQL, Python, DataFrames, and More," https://databricks.com/blog/2015/04/24/recent-performance-improvements-in-apache-spark-sql-python-dataframes-and-more.html, Apr. 24, 2015, 4 pages.

R. Xin et al., "Project Tungsten: Bringing Apache Spark Closer to Bare Metal," https://databricks.com/blog/2015/04/28/project-tungsten-bringing-spark-closer-to-bare-metal.html, Apr. 28, 2015, 5 pages.

S. Kedia et al., "Apache Spark @Scale: A 60 TB+ Production Use Case from Facebook," https://databricks.com/blog/2016/08/31/apache-spark-scale-a-60-tb-production-use-case.html, Aug. 31, 2016, 8 pages.

A. Grishchenko, "Spark Architecture: Shuffle," Distributed Systems Architecture, https://0x0fff.com/spark-architecture-shuffle/, Aug. 24, 2015, 16 pages.

S. Ryza et al., "Improving Sort Performance in Apache Spark: It's a Double," http://blog.cloudera.com/blog/2015/01/improving-sort-performance-in-apache-spark-its-a-double/, Jan. 14, 2015, 7 pages.

Y. Collet et al., "Smaller and Faster Data Compression with Zstandard," https://code.facebook.com/posts/1658392934479273/smaller-and-faster-data-compression-with-zstandard/, Aug. 31, 2016, 15 pages.

P. Wendell, "Understanding the Performance of Spark Applications," Spark Summit 2013, Dec. 2-3, 2013, 32 pages.

R. Agarwal et al., "Succinct: Enabling Queries on Compressed Data," Proceedings of the 12th USENIX Symposium of Networked Systems Design and Implementation (NSDI), May 4-6, 2015, 15 pages.

Moor Insights & Strategy, "Gen-Z & Emerging System Requirements: Data Will Change the Architecture & Operation of Future Systems," http://www.moorinsightsstrategy.com/research-paper-gen-z-emerging-system-requirements/, Jan. 10, 2017, 13 pages.

T. Talpey et al., "RDMA Durable Write Commit," Internet Engineering Task Force (IETF) Internet-Draft, https://tools.ietf.org/html/draft-talpey-rdma-commit-00, Feb. 19, 2016, 25 pages.

Microsemi Corporation, "Flashtec NVRAM Drives," https://www.microsemi.com/products/storage/flashtec-nvram-drives/flashtec-nvram-drives, 2017, 2 pages.

R. Agarwal et al., "Succinct Enabling Queries on Compressed Data: +Apache Spark," http://succinct.cs.berkeley.edu/wp/wordpress/?page_id=8, Oct. 9, 2015, 11 pages.

\* cited by examiner

MEMORY OPTIMIZED DATA SHUFFLE

FIELD

The field relates generally to information processing systems such as distributed data processing systems, and more particularly to techniques for providing improved data shuffling in such distributed data processing systems.

BACKGROUND

Data shuffling is a process of exchanging, re-distributing, or re-partitioning data based on pre-defined rules among nodes in a distributed data processing system. Data shuffling is a key component in modern data analytics and high-performance computing (HPC). For example, data shuffling is a key step in the implementation of MapReduce processing frameworks. Non-limiting examples of MapReduce processing frameworks include Apache™ Hadoop® and Apache™ Spark™ (The Apache Software Foundation). In this context, data shuffling is a process performed to transfer data from a mapper node to a reducer node by redistributing data in M*N ways based on output keys produced by the mapper node, such that all data belonging to one key is preferably located on the same node. That is, data shuffling acts as a bridge between the map phase and the reduce phase of a MapReduce processing framework. However, performing data shuffling on large datasets impacts the overall performance of a distributed data processing system.

SUMMARY

Embodiments of the invention provide improved data shuffling in distributed data processing systems.

For example, in one embodiment, a method comprises the following steps. In a distributed data processing system with a set of multiple nodes, a first data shuffle memory pool is maintained at a data shuffle writer node, and a second data shuffle memory pool is maintained at a data shuffle reader node. The data shuffle writer node and the data shuffle reader node are part of the set of multiple nodes of the distributed data processing system. In-memory compression is performed on at least a portion of a data set from the first data shuffle memory pool. At least a portion of the compressed data is transmitted from the first data shuffle memory pool to the second data shuffle memory pool in a peer-to-peer manner. The distributed data processing system is implemented via one or more processing devices.

In another embodiment, each of the first data shuffle memory pool and the second data shuffle memory pool comprise a hybrid memory configuration, which comprises dynamic random access memory and nonvolatile random access memory. The memory pools may be configured in one or more memory tiers.

Advantageously, illustrative embodiments provide for a memory optimized data shuffling mechanism that reduces the consumption of system resources (e.g., compute resources, memory resources, disk storage resources, input/output resources and/or network resources), as compared to conventional applications of data shuffling, since data transfer in illustrative embodiments is performed in a peer to peer manner directly between the memories of the two nodes, which are configured with in-memory compression functionalities (e.g., compression and/or decompression functions). For example, data can be transferred using remote direct memory access. Such reduced resource consumption corresponds to higher overall system performance.

These and other features and advantages of the invention will become more readily apparent from the accompanying drawings and the following detailed description.

DETAILED DESCRIPTION

Illustrative embodiments of the present invention will be described herein with reference to exemplary distributed data processing systems and associated computers, servers, storage devices and other processing devices. It is to be appreciated, however, that embodiments of the invention are not restricted to use with the particular illustrative system and device configurations shown. Accordingly, the term "distributed data processing system" as used herein is intended to be broadly construed, so as to encompass, for example, processing systems comprising cloud computing and storage systems, as well as other types of processing systems comprising various combinations of physical and virtual processing resources. A distributed data processing system may therefore comprise, for example, at least one data center that includes one or more clouds hosting multiple tenants that share cloud resources.

As will be further explained herein, illustrative embodiments of the invention recognize that performing conventional data shuffling techniques may significantly impact performance of a distributed data processing system and, as such, provides methodologies and systems for reducing resource consumption during data shuffling to increase overall system performance.

Figure 1:
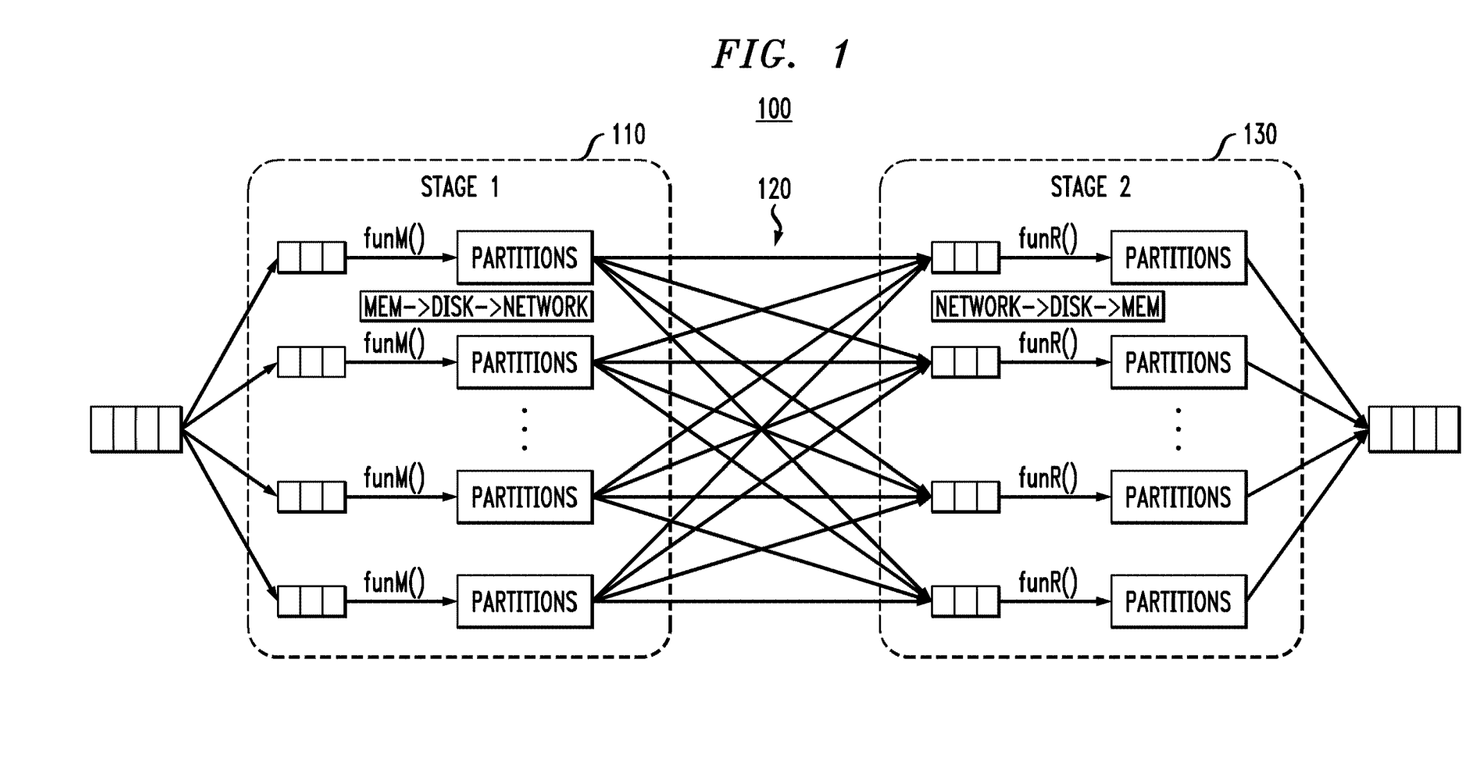
FIG. 1 illustrates a workflow for shuffling data in a typical MapReduce processing framework.

FIG. 1 illustrates a workflow 100 for performing data shuffling in a typical MapReduce processing framework. As summarized by the illustration, workflow 100 is divided into three functional sections: a section 110, a section 120, and a section 130. Section 110 is a map stage or phase, section 120 is a shuffle stage or phase, and section 130 is a reduce stage or phase.

A MapReduce processing framework allows for distributed workload processing of an input data set. The map stage (section 110) performs a partitioning of the input data set. Partitioning determines to which reducer nodes the outputs of the map stage, i.e., (key, value) pairs, will be sent. The map stage uses a map function (e.g., funM( ) as shown in section 110) to determine how to distribute the data.

The partitions are then transferred to the appropriate reducer nodes in the data shuffle stage (data shuffle section 120). The data shuffle stage acts as a bridge function between the map stage and the reduce stage such that all data belonging to a given partition key is distributed to the same reducer node.

In the reduce stage (section 130), multiple reducer nodes receive their respective data from a mapper node. If sorting is applied in the MapReduce framework, the reducer node is more easily able to determine when a new reduce task should begin (e.g., when the next key in the sorted input data is different than the previous key, this signals to the reducer node to start a new reduce task). The reducer node then performs the reduce function based on the partition key (e.g., funR( ) as shown in section 130).

Accordingly, using sorting, partitioning, and data shuffling, a mapper node redistributes data in M*N ways to the appropriate reducer nodes. A mapper node that performs sorting and partitioning is typically referred to as a performing partition-based sorting (as in the workflow example of FIG. 1).

Typically, the data path between a mapper node and a reducer node for the transferred data is from memory (of the mapper node) to disk storage (of the mapper node) to network (that connects the mapper node and the reducer node), then from the network to disk storage (of the reducer node) to memory (of the reducer node). It is realized that this transfer path consumes a significant amount of system resources (e.g., compute resources, memory resources, disk storage resources, input/output resources and/or network resources).

Figure 2:
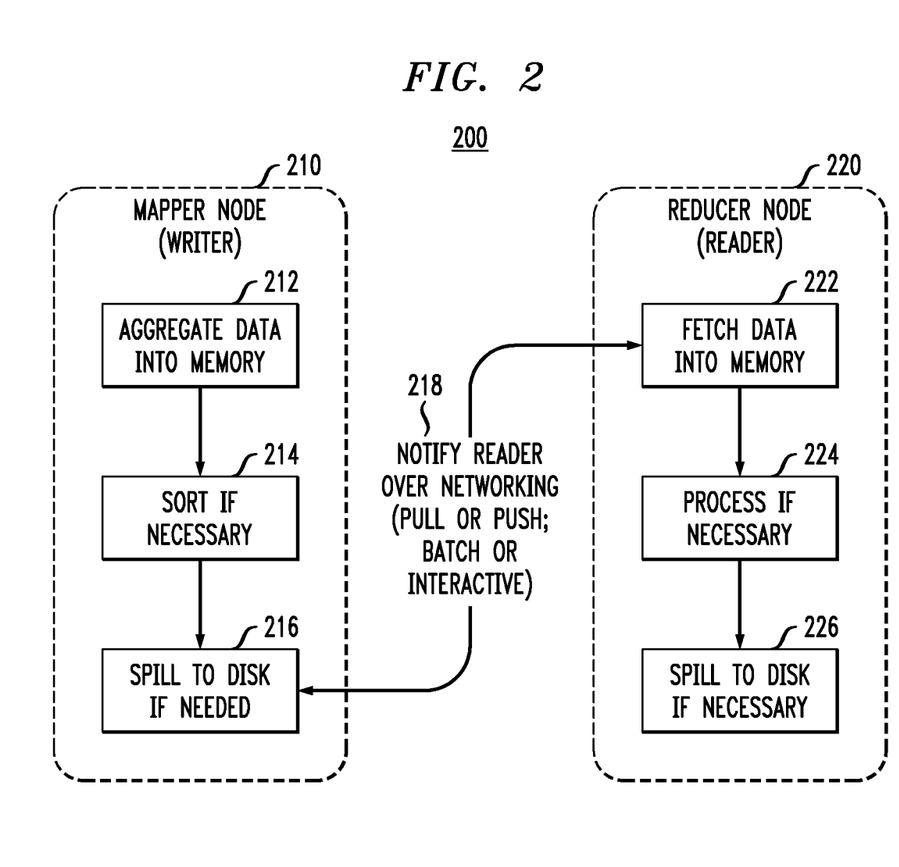
FIG. 2 illustrates a data shuffle methodology between a mapper node and a reducer node that can be used in the framework of FIG. 1.

FIG. 2 illustrates an overall data shuffle methodology 200 between a data shuffle writer 210 and a data shuffle reader 220 of a processing framework 200. In this example, processing framework 200 is a MapReduce processing framework. As such, it is assumed that data shuffle writer 210 is associated with a mapper node and data shuffle reader 220 is associated with a reducer node. Thus, as shown at step 212, data shuffle writer 210 aggregates data into memory. At step 214, data shuffle writer 210 sorts the aggregated data, if necessary. At step 216, data shuffle writer 210 transfers the data (spills) to disk storage, if needed. At step 218, data shuffle reader 220 is notified over the network depending on how the shuffle process is being implemented, e.g., push or pull, batch or interactive. For example, data shuffle writer 210 may push the data to the local memory buffer of the data shuffle reader 220 (with the data traversing disk storage/network resources), or data shuffle reader 220 may fetch or pull the data into the local memory buffer (again with the data traversing disk storage/network resources). Step 222 illustrates data shuffle reader 220 fetching the data. At step 224, data shuffle reader 220 processes the received data, if necessary. At step 226, data shuffle reader 220 transfers the data (spills) to disk storage, if necessary. Further details regarding the steps performed by data shuffle writer 210 are described below with reference to FIG. 3.

Figure 3:
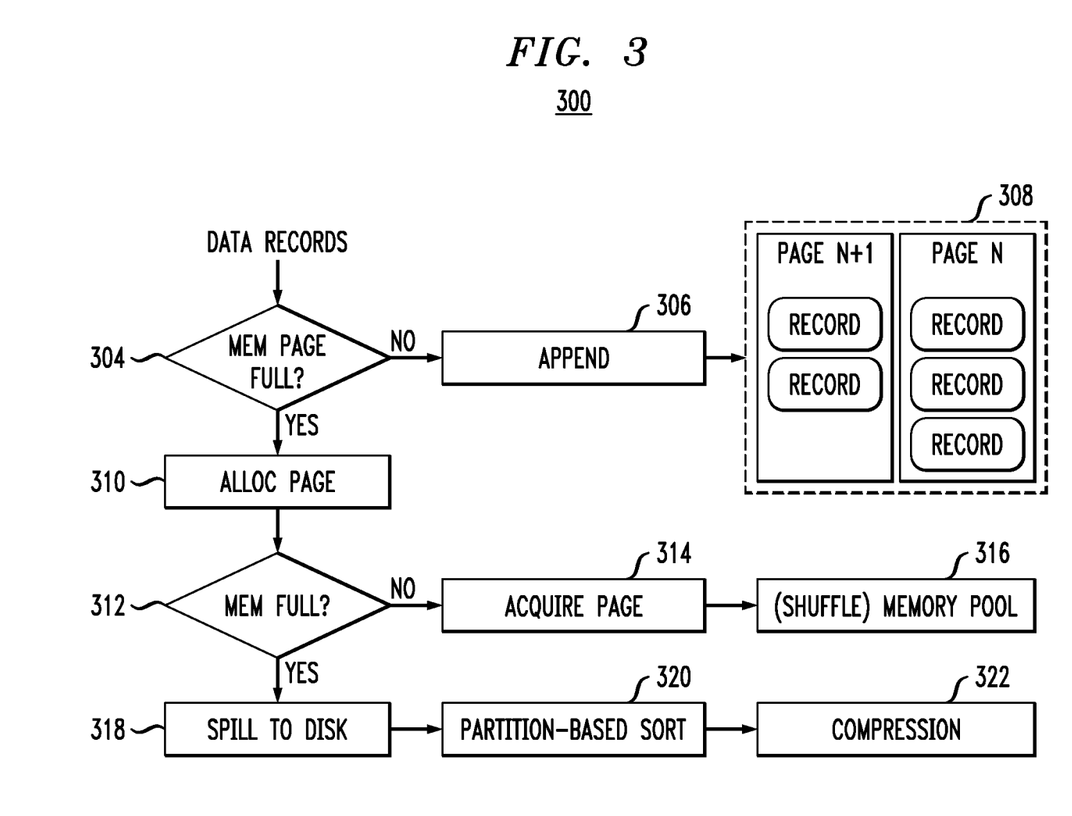
FIG. 3 illustrates a data shuffle methodology between a mapper node and a reducer node that can be used in the framework of FIG. 1.

FIG. 3 illustrates further details 300 regarding steps performed by data shuffle writer 210 of FIG. 2. In this example, data records are aggregated into a page comprised in a page table. For example, the data records may be split into 128 MB pages. At step 304, it is determined whether or not the current memory page of the page table is full. A full page is one that is filled to maximum capacity with records. If not full, the aggregated data records are appended to page table 308 at step 306.

However, if the current memory page of the page table is determined to be full at step 304, a request to allocate one or more pages is sent at step 310. Then, at step 312, it is determined whether or not the memory is currently full (i.e., if there is enough memory to store the aggregated data records during sorting). In this example, the memory is a shuffle memory that is either shared with other data (but with quota setting) or dedicated for shuffle. If the memory is not full, a page is acquired at step 314 and allocated at step 316 in the memory.

However, in the event that there is not enough free memory, the data is spilled to disk storage at step 318. Disk storage may include, by way of example, local file storage, Hadoop Distributed File System (HDFS) storage, network attached storage (NAS), or cloud-based storage. At step 320, partition-based sorting is performed. In this example, a record pointer may be used to increase the efficiency of the partition-based sorting. The record pointer may comprise a pointer to the value stored with the key of the (key, value) pair. Such a record pointer may be used to aggregate the data records to the next stage partition for batch retrieval, thus achieving higher performance. One example implementation that utilizes such a pointer is the so-called Tungsten-short shuffle used by Apache™ Spark™ At step 322, disk-level compression is performed. The disk-level compression may be performed to reduce resource consumption (e.g., network resource consumption) when the data is transferred from disk storage to a data shuffle reader, such as data shuffle reader 220 of FIG. 2.

However, as mentioned above, since the data path from a data shuffle writer node to a data shuffle reader node is from memory to disk to network, then from the network to disk to memory, a significant amount of compute resources, memory resources, disk storage resources, input/output resources and/or network resources are consumed.

Illustrative embodiments of the invention overcome these and other drawbacks by providing memory optimized data shuffle systems and methodologies, as will be illustratively explained below in the context of FIGS. 4-10.

Figure 4:
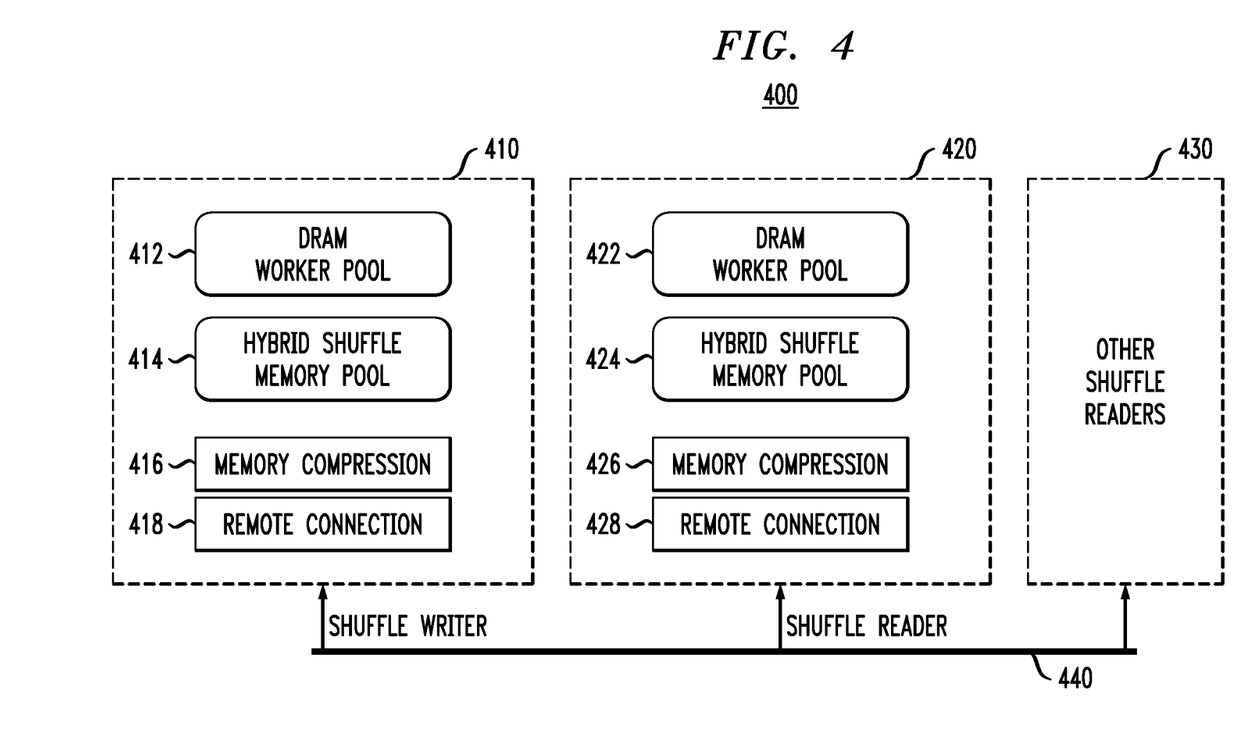
FIG. 4 illustrates a hybrid memory pool for data shuffling, according to an embodiment of the invention.

FIG. 4 illustrates a data shuffle system 400, according to an embodiment of the invention. As shown, system 400 comprises data shuffle writer node (shuffle writer) 410, data shuffle reader node (shuffle reader) 420, and one or more additional data shuffle reader nodes 430, connected via fabric 440. As shown, shuffle writer 410 comprises a dynamic random access memory (DRAM) worker pool 412, a hybrid shuffle memory pool 414, a memory compression module 416, and a remote connection 418. Similarly, shuffle reader 420 comprises a DRAM worker pool 422, a hybrid shuffle memory pool 424, a memory compression module 426, and a remote connection 428. Thus, the memory capacity of shuffler writer 410 and shuffler reader 420 is partitioned as a shuffle memory pool and an activity working memory pool for active data processing. Each other shuffle reader 430 is assumed to have the same configuration as shown in shuffle reader 420. Further details regarding hybrid shuffle memory pool configurations are provided below with reference to FIG. 5.

To fully exploit shuffle workload characteristics and improve performance, the hybrid shuffle memory pool described above in FIG. 4 may provide a combination of DRAM and nonvolatile RAM (NVRAM), where the NVRAM may be a combination of local memory and remote memory. Advantageously, shuffle data for re-partition may be saved into pages from the hybrid shuffle memory pool, where the hybrid shuffle memory pool comprises one or more tiers.

Figure 5:
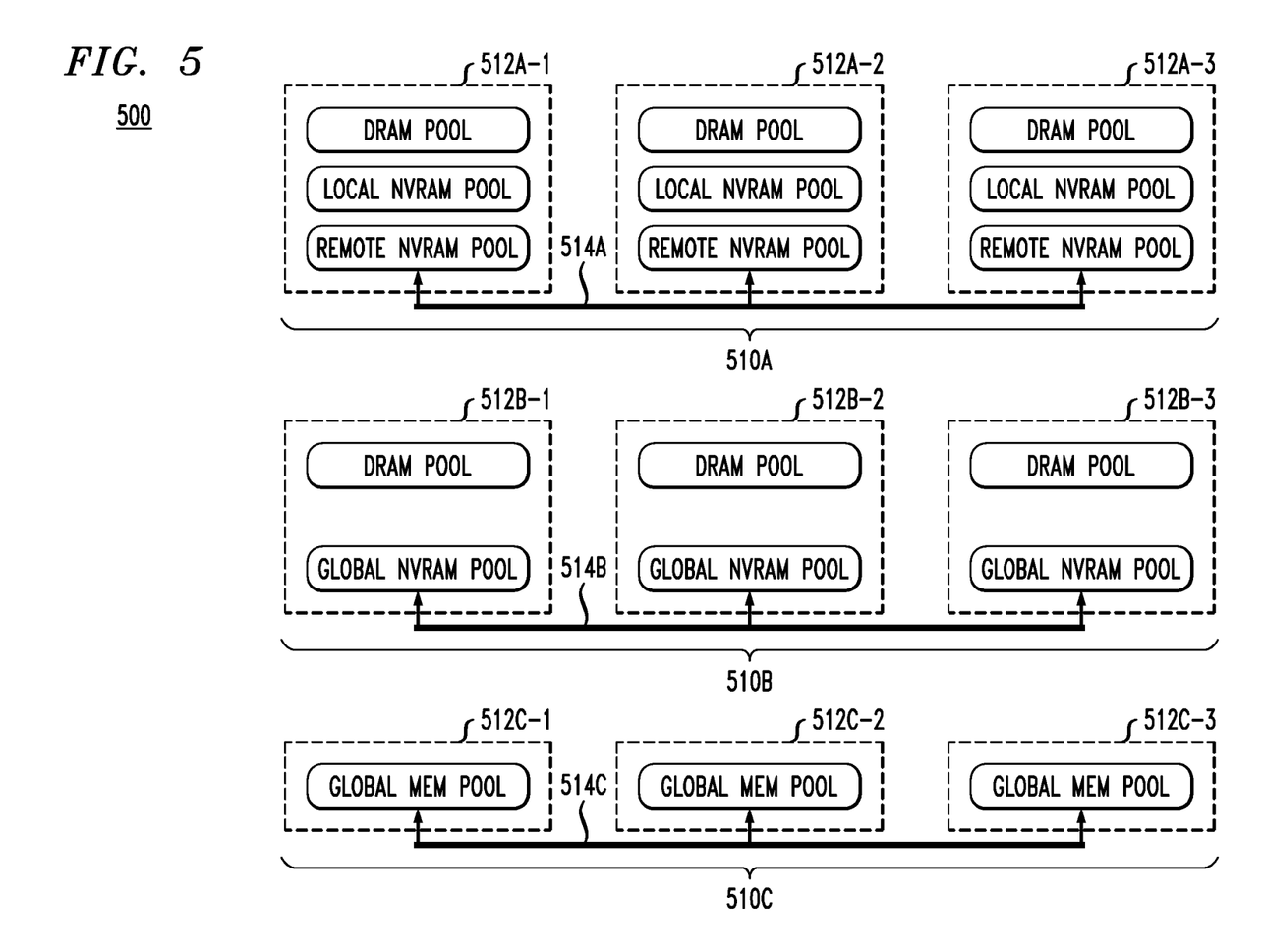
FIG. 5 illustrates configurations for a data shuffle memory pool, according to an embodiment of the invention.

FIG. 5 illustrates various configurations for a data shuffle memory pool, including configuration 510A, configuration 510B and configuration 510C, according to embodiments of the invention.

As shown, configuration 510A comprises nodes 512A-1, 512A-2 and 512A-3 connected via fabric 514A. The nodes can be any combination of shuffle writer nodes and/or shuffle reader nodes. Such a three-tier configuration is configured to provide flexibility in controlling the usage of each tier. Thus, in configuration 510A, the shuffle memory pool of each node (512A-1 through 512A-3) comprises three tiers. These tiers include a DRAM pool, a local NVRAM pool and a remote NVRAM pool. In one embodiment, the DRAM pool is used for high priority/valued metadata (e.g., composed record pointers), while the local NVRAM pool and the remote NVRAM pool are used for most data records. Fabric 514A may include fast interconnection with remote direct memory access (RDMA) capabilities such as, but not limited to, 10 Gigabit Ethernet (GbE) or greater, InfiniBand (IB) with latency less than 10 microseconds, etc. Thus, a data set transmitted between the nodes may be transferred using RDMA.

As opposed to being provisioned through a global pool management mechanism, the remote NVRAM pool may be provisioned in a direct peer-to-peer manner per shuffle direction. The local NVRAM pool and/or the remote NVRAM pool may be mapped to a system memory address of its corresponding node through an implementation such as, by way of example, IOPMem. The remote memory pool may also be extended to include DRAM or a mixed use of DRAM and NVRAM.

Further, as shown in FIG. 5, configuration 510B comprises nodes 512B-1, 512B-2 and 512B-3 connected via fabric 514B. Configuration 510B is associated with a two-tier configuration in which the shuffle memory pool of each node comprises two tiers. That is, nodes 512B-1 through 512B-3 illustratively comprise two tiers. These tiers include a DRAM memory tier (e.g., DRAM pool) and a global NVRAM memory tier (e.g., global NVRAM pool). In configuration 510B, multiple nodes contribute their DRAM and/or NVRAM as a global memory pool (with appropriate mapping, addressing or naming semantics). The shuffle node utilizes a logical subset of the global memory pool via pro-active mapping. As in configuration 510A, the fabric 514B of the two-tier configuration of 510B may utilize the same or similar fast interconnection with remote direct memory access (RDMA) capabilities.

Still further, as shown in FIG. 5, configuration 510C comprises nodes 512C-1, 512C-2 and 512C-3 connected via fabric 514C. Configuration 510C is associated with a single-tier configuration in which the shuffle memory pool of each node comprises a single global shared memory tier. This single tier is represented as a global memory pool. In configuration 510C, multiple nodes contribute their DRAM and/or NVRAM as a global memory pool (with appropriate mapping, addressing or naming semantics). In this configuration, the shuffle node utilizes a logical subset of the global memory pool via pro-active mapping. As in configuration 510A, the fabric 514C of the single-tier configuration of 510C may utilize the same or similar fast interconnection with remote direct memory access (RDMA) capabilities. A further example of such a global memory pool will be described below in the context of FIG. 7.

Figure 6:
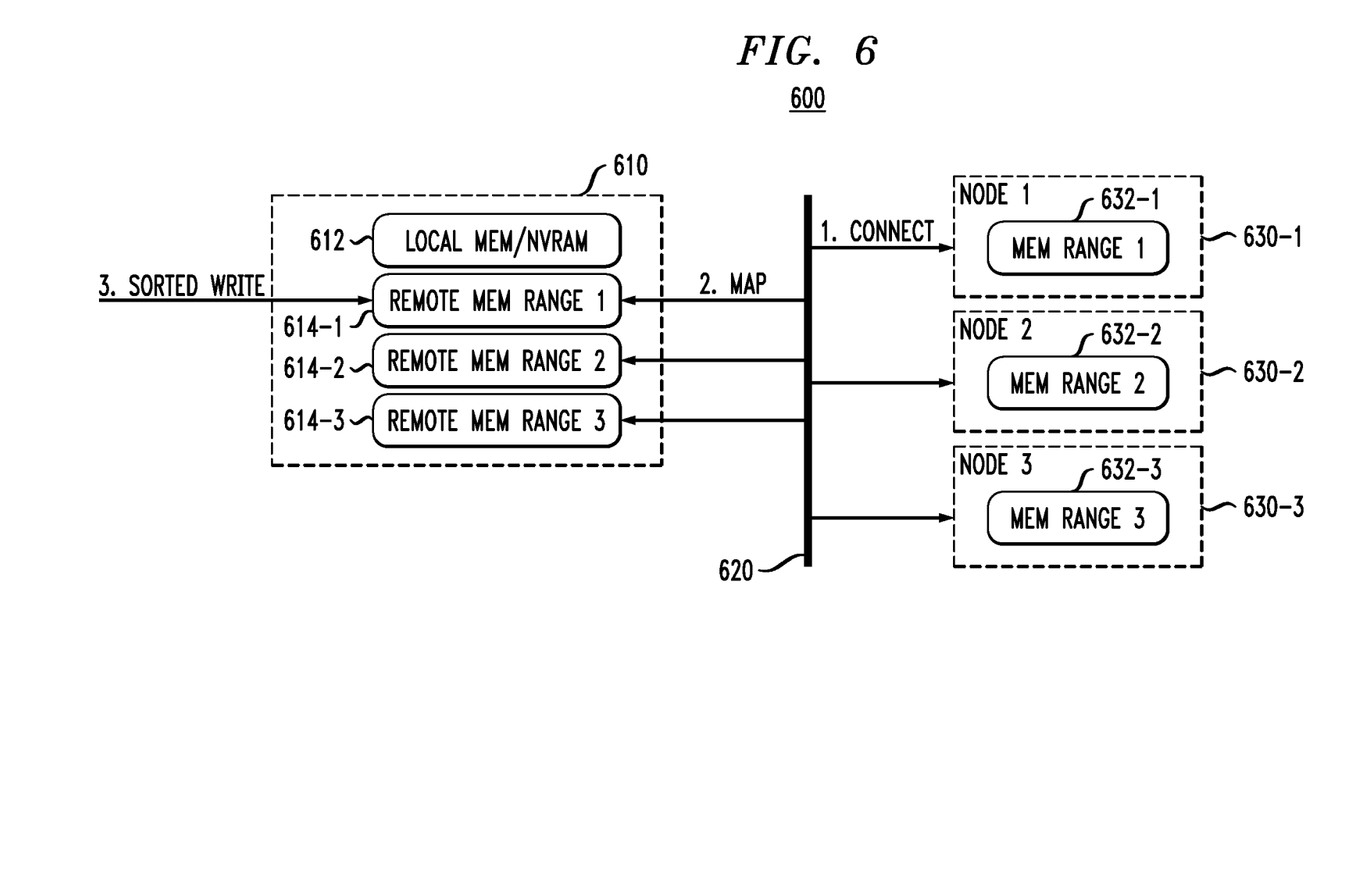
FIG. 6 illustrates provisioning of remote memory via a peer-to-peer mapping and sorted-write, according to an embodiment of the invention.

FIG. 6 illustrates provisioning of remote memory via a peer-to-peer mapping and sorted-write, according to one embodiment of the invention. As shown, data shuffle writer node 610 is in communication with data shuffle reader nodes 630-1, 630-2, and 630-3 via fabric 620. The number of nodes depicted in FIG. 6 is purely exemplary, and should not be considered limiting. Shuffle reader nodes 630-1 through 630-3 may be considered to be target shuffle reader nodes.

As further shown, data shuffle writer node 610 comprises local memory and one or more remote memory ranges. More particularly, data shuffle writer node 610 comprises local memory 612 and three remote memory ranges 614-1, 614-2 and 614-3. The number of remote memory ranges depicted in FIG. 6 should not be considered limiting. Note that the memory configuration in the writer node corresponds to configuration 510A in FIG. 5. Local memory in this example is NVRAM, while remote memory can be DRAM and/or NVRAM. However, alternative memory configurations can be utilized.

Further, data shuffle reader nodes 630-1 through 630-3 comprise respective memory ranges 632-1, 632-2, and 632-3. Note that memory ranges 632-1, 632-2, and 632-3 in the reader nodes correspond, respectively, to remote memory ranges 614-1, 614-2 and 614-3 in writer node 610. Connection to memory ranges 632-1, 632-2, and 632-3 is established through fabric 620. The connection may be established proactively according to a shuffle re-partition rule, which could occur when a new record comes in, or when records spill to disk storage. In one embodiment, the connection is enabled with RDMA capability. Advantageously, the connection between the memories of the writer node and reader nodes memory is relatively short as compared to existing data shuffle implementations that connect through main (disk) storage.

After the connection is established (step 1), memory ranges 632-1, 632-2, and 632-3 are mapped (step 2) to remote memory ranges 614-1, 614-2, and 614-3, respectively, through fabric 620. Accordingly, the memory, either DRAM or NVRAM, is mapped from a remote node to local ranges (using unique identifiers, e.g., memory addresses).

The portion of the data set to be transmitted is sorted (step 3) in at least one of remote memory ranges 614-1, 614-2, and 614-3. In this example shown, at least remote memory range 614-1 is configured to perform a sorted write. The sorted write is in-line (i.e., sorted as it comes in) and is more straightforward to implement as data records are naturally appended to the memory pages of different shuffle readers without requiring the use of an extra composed record pointer (as discussed above in the context of FIG. 3).

It is to be appreciated that the connection, mapping, I/O and lifecycle management are driven mainly by data shuffle, rather than by targeting a common memory pool solution. Depending on control logic and/or RDMA implementation, data could be pulled from the local memory or pushed to a target node. Once data is moved, the connection could be cached for re-use until a pre-defined time-out. This peer-to-peer manner of mapping and sorted write processing has appropriate scalability to match share-nothing distributed data analytics without the need of central metadata management.

Figure 7:
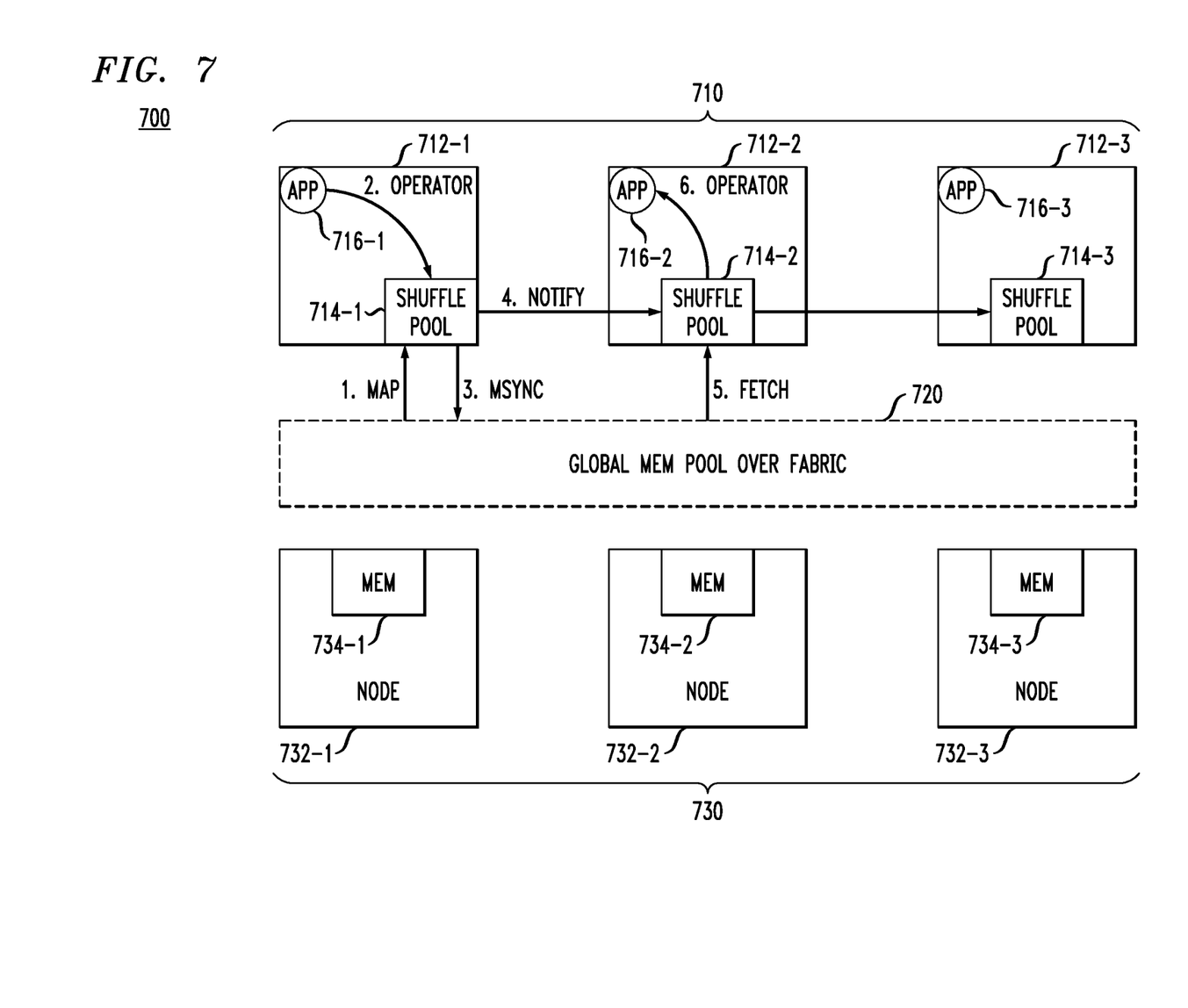
FIG. 7 illustrates a global memory pool via a decentralized cluster, according to an embodiment of the invention.

FIG. 7 illustrates a decentralized global memory pool system 700, according to an embodiment of the invention. System 700 comprises set of consumer nodes 710, which illustratively comprise nodes 712-1, 712-2, and 712-3, fabric 720, and a set of provider nodes 730, which illustratively comprises node nodes 732-1, 732-2, and 732-3. Node 712-2 in this illustrative embodiment is a reader node. The global memory pool shown in FIG. 7 may be viewed as a generic global memory pool, and may comprise the global NVRAM pool of the two-tier configuration of FIG. 5 or the global memory pool of the single-tier configuration of FIG. 5. Nodes 732-1, 732-2, and 732-3 comprise memory 734-1, 734-2, and 734-3, respectively. Memory 734 may comprise RAM, such as DRAM and/or NVRAM.

As shown in FIG. 7, nodes 712-1, 712-2 and 712-3 comprise shuffle pools 714-1, 714-2 and 714-3, respectively, as well as applications (Apps) 716-1, 716-2 and 716-3, respectively. The global memory pool is configured to perform a map function (step 1) to shuffle pool 714-1 in order for node 712-1 to construct a logical shuffle memory pool (step 2).

In one embodiment, App 716-1 then generates new records and sends the generated records to shuffle pool 714-1. After receiving the generated records, shuffle pool 714-1 is configured to perform an msync function (step 3) in order to sync the records to the global memory pool. Then, node 712-1 is configured to notify (step 4) node 712-2 to fetch or retrieve (step 5) the synced records from global memory pool. The notification may be performed via a pre-defined naming and metadata mechanism such as bucket ID. After the synced records are fetched by node 712-2, data processing continues (step 6).

In an alternative embodiment, depending on the level logic of App 714-1, if App 714-1 does not generate new data, or generates new data comprising data associated with accumulated operations abstracted from an existing data set, such as sum, average, etc., then performing the msync function and/or data movement may not be necessary. Rather, the operation description may be transferred directly to node 712-2 for continuous processing.

Figure 8:
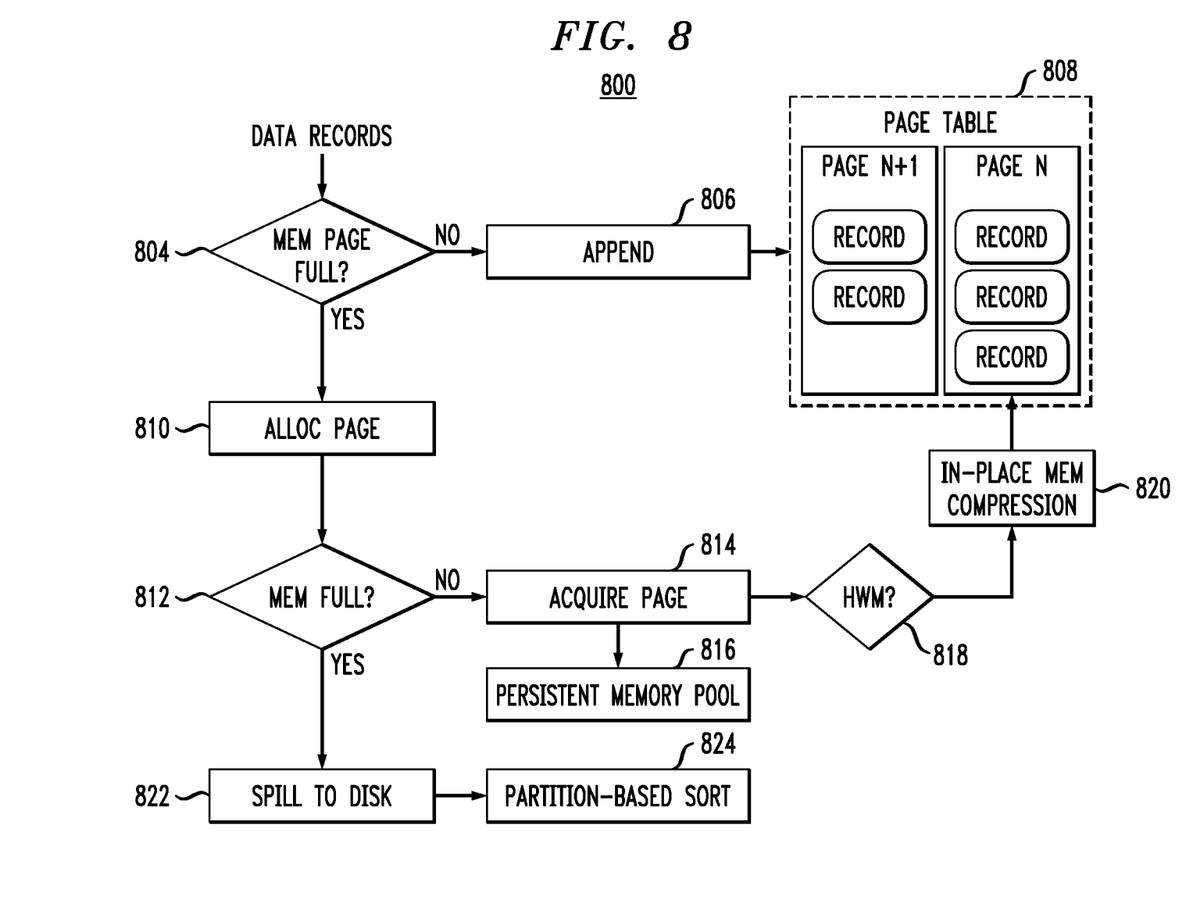
FIG. 8 illustrates an in-memory compression methodology, according to an embodiment of the invention.

FIG. 8 illustrates an in-memory compression methodology 800. It is assumed in this illustrative embodiment that data had been previously processed at a node, such as a mapper node of a MapReduce processing framework.

In one embodiment, the data records are aggregated into a page comprised in a page table. For example, the data records may be split into 128 MB pages. At step 804, it is determined if the current memory page of the page table is full. A full page is one that is completely filled with records. If not, the aggregated data records are appended to page table 808 at step 806.

However, if the current memory page of the page table is determined to be full at step 804, a request to allocate one or more pages is sent at step 810. Then, at step 812, it is determined if the memory pool is currently full (i.e., if there is enough memory in the memory pool to store the aggregated data records during sorting). In one embodiment, the memory pool is a shuffle memory pool that is either shared with other data (but with quota setting) or dedicated for shuffle. If the memory pool is not full, a page is acquired at step 814 and is stored at step 816 at a persistent memory pool.

To maximize memory efficiency, an on-demand shuffle memory pool compression process (rather than disk data compression) that preserves sorting capability is performed after acquiring the page at step 814. The performance of the in-memory compression may be triggered by a given policy at step 818. The given policy may be based on, for example, a pre-defined memory pressure (capacity) threshold, e.g., a high water mark (HWM) of approximately 75% full, and/or a ratio of incoming write speed to outgoing read speed. If in-memory compression is not triggered by the given policy, then the in-memory compression does not occur. However, if in-memory compression is triggered by the given policy, then in-memory compression occurs at step 820. A new incoming record write can enable compression when it is sent to a shuffle page.

Light-weight compressions may be used to reduce compute (central processing unit or CPU) cycle cost. To further reduce the CPU overhead of the compression, the thread number and compression pace can be configurable in one or more embodiments. For example, if the memory usage is over 50%, then one compression may be initiated, and if the memory usage is over 75%, then two or more threads may be initiated.

Referring back to step 812, in the event that there is not enough free memory in the memory pool, the data is spilled to disk storage at step 822. At step 824, partition-based sorting is performed. In one embodiment, a record pointer may be used to increase the efficiency of the partition-based sorting. The record pointer may comprise a pointer to the value stored with the key of the (key, value) pair. Such a record pointer may be used to aggregate the data records to the next stage partition for batch retrieval, thus achieving higher performance. The data stored on the disk storage is then merged from the disk storage upon completion of the sorting.

Figure 9A:
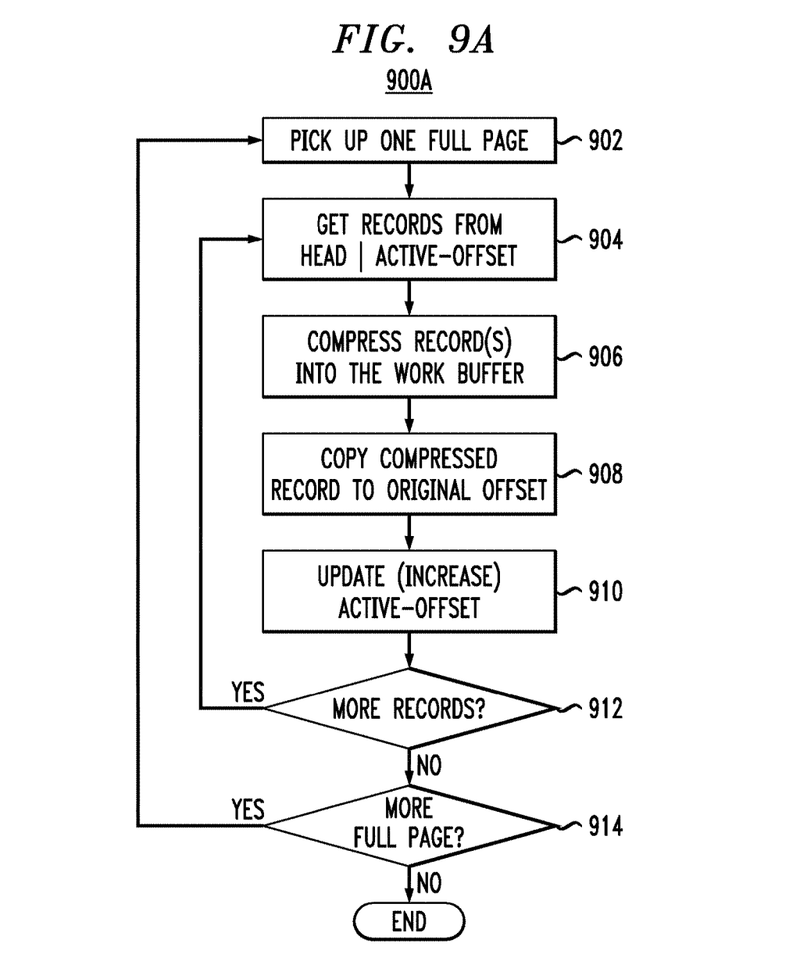
FIG. 9A illustrates details of the in-memory compression methodology of FIG. 8, according to an embodiment of the invention.

FIG. 9A illustrates an exemplary methodology for performing the in-memory compression step 820 of FIG. 8. At step 902, one full page (e.g., an initial full page) is picked up or received. A full page is a page that is completely filled with records.

At step 904, record(s) are obtained from head/active offset.

At step 906, the obtained records are compressed in at least one work buffer. In one embodiment, only one work buffer is needed per compression thread since the compression is being performed consecutively. The work buffer functions to temporarily save the compressed records.

Variables, including active offset and free offset, are maintained to indicate current compression progress. The active offset indicates the beginning of the next non-compressed record, and the free offset indicates the end of the last compressed record.

At step 908, the compressed record(s) are copied back to the page to the original offset, and at step 910, the active offset is updated (i.e., increased).

At this point, extra memory room has been reclaimed, and more compressed records may be accommodated in the page. At step 912, it is determined if there are any more records remaining. If so, the process goes back to step 904 to obtain the remaining record(s). If there are no records remaining, it is determined at step 914 if there are any full pages left. If so, the process goes back to step 902 to pick up the next full page. If there are no full pages left, the process ends.

Figure 9B:
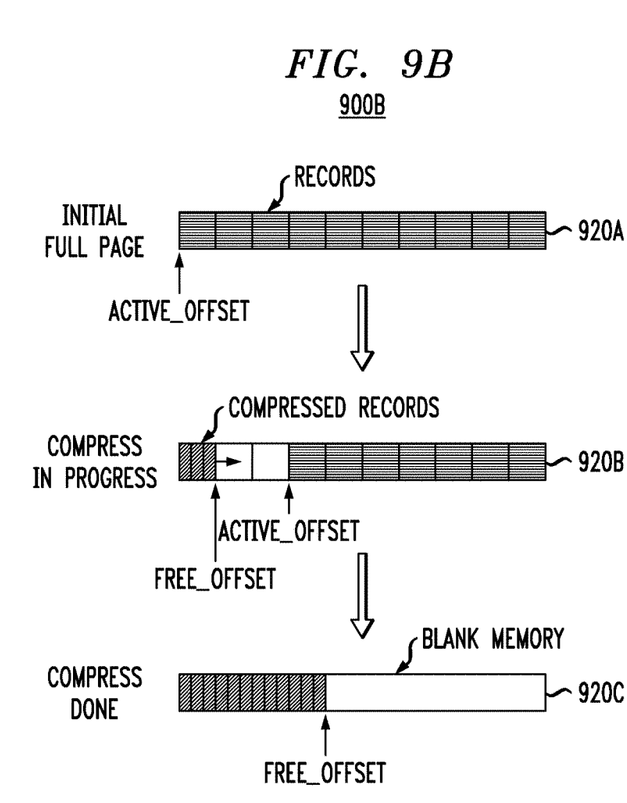
FIG. 9B illustrates a visualization of the methodology of FIG. 9A, according to an embodiment of the invention.

FIG. 9B illustrates a visualization of the in-memory compression methodology of FIG. 9A, according to an embodiment of the invention. Item 920A represents an initial full page comprising records and an active offset prior to compression. Item 920B represents the page while compression is in progress. As shown, a free offset and the active offset are updated. Item 920C represents the page after the compression is done. As shown in item 920C, there are no remaining records for compression within the page. That is, the page comprises compressed data and free memory. Additionally, the free offset is updated to reflect the position of the last compressed record.

The embodiments described herein provide for a memory optimized distributed data shuffle mechanism. One or more embodiments may utilize a hybrid shuffle memory pool comprising, for example, DRAM and local and remote NVRAM with RDMA capability. The hybrid model is maximized by placing hot active data in the DRAM, and shuffle data (warm and in-motion) in a pool comprising one or more internal tiers with dynamic mapping and appropriate scalability. As opposed to existing disk data compression, an in-place memory compression methodology is utilized to store more data in shuffle memory and preserve write-sorted capability.

As such, shuffle workload has unique characteristics that could be fully exploited: "motion" which characterizes data that is going to transmit to target shuffle reader (by partition key); "warm" which characterizes data that has rare local access (or update), meaning it is not hot; and "extent" which characterizes data usually sorted and aggregated as extent by partition key.

While embodiments of the invention are not limited to any particular in-memory compression technique, non-limiting examples of such memory compression techniques include LZ4, Zstandard, Snappy, RLE Sparse, or some custom-designed method such as Succinct.

Illustrative embodiments can be integrated into existing modern MapReduce systems such as Apache™ Spark™. For example, the hybrid shuffle memory pool can be one of backing drivers of off-heap memory, and in-place memory compression can be implemented as background thread(s) and triggered by HWM policy.

Figure 10:
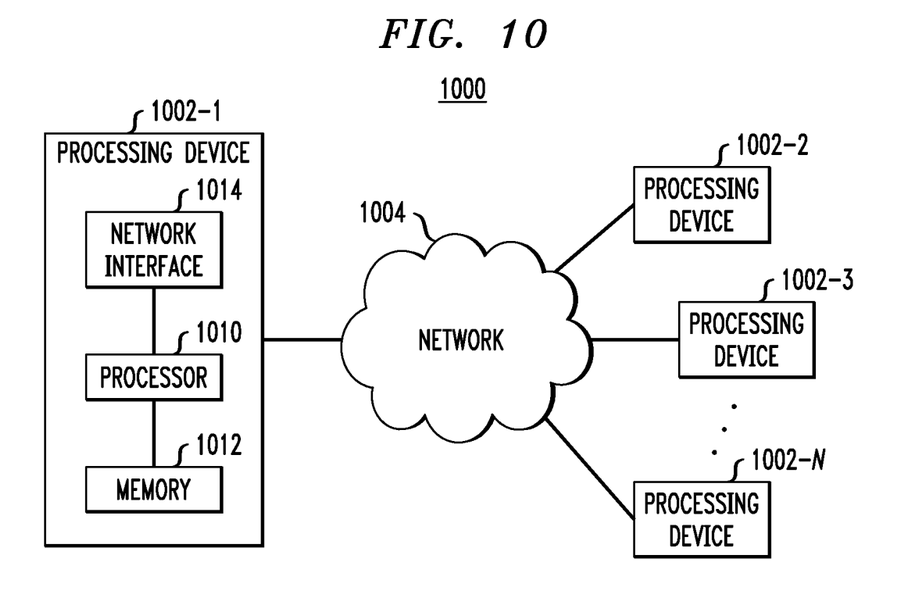
FIG. 10 illustrates a processing platform used to implement a distributed data processing system with memory optimized data shuffling functionality, according to an embodiment of the invention.

An example of a processing platform on which the illustrative embodiments can be implemented is processing platform 1000 shown in FIG. 10. The processing platform 1000 in this embodiment comprises a plurality of processing devices, denoted 1002-1, 1002-2, 1002-3, ... 1002-N, which communicate with one another over a network 1004. It is to be appreciated that the methodologies described herein may be executed in one such processing device 1002, or executed in a distributed manner across two or more such processing devices 1002. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 10, such a device comprises at least one processor and an associated memory, and implements one or more functional modules for instantiating and/or controlling features of systems and methodologies described herein. Multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device, such as the processing device 1002-1, causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002 (1002-2, 1002-3, ... 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the data valuation system and infrastructure described herein may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1000 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from Dell EMC Corporation of Hopkinton, Mass.). A variety of other computing and storage products may be utilized to implement the one or more cloud services that provide the functionality and features described herein.

It was noted above that portions of the processing framework described herein may be implemented using one or more processing platforms. A given such processing platform comprises at least one processing device comprising a processor coupled to a memory, and the processing device may be implemented at least in part utilizing one or more virtual machines, containers or other virtualization. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   maintaining a first data shuffle memory pool at a data shuffle writer node and a second data shuffle memory pool at a data shuffle reader node, wherein the data shuffle writer node and the data shuffle reader node are part of a set of multiple nodes of a distributed data processing system;
   performing an in-memory compression on at least a portion of a data set from the first data shuffle memory pool;
   performing a data shuffle operation on the at least a portion of the compressed data from the first shuffle memory pool, wherein the data shuffle operation maps different parts of the compressed data for transmission to different nodes of the distributed data processing system; and
   transmitting, in response to the data shuffle operation, the at least a portion of the compressed data from the first data shuffle memory pool to the second data shuffle memory pool in a peer-to-peer manner;
   wherein the distributed data processing system is implemented via one or more processing devices.

2. The method of claim 1, wherein the performance of the in-memory compression is triggered by a given policy.

3. The method of claim 2, wherein the given policy is based on a memory pressure associated with a memory capacity threshold.

4. The method of claim 2, wherein the given policy is based on a ratio of incoming write speed to outgoing read speed.

5. The method of claim 1, wherein performing the in-memory compression further comprises:
   obtaining one or more records;
   compressing the obtained records into a work buffer;
   copying the compressed records to an original location of the one or more compressed records; and
   updating an active location, the active location indicating the beginning location of a next non-compressed record.

6. The method of claim 1, wherein each of the first data shuffle memory pool and the second data shuffle memory pool comprise a hybrid memory configuration.

7. The method of claim 6, wherein the hybrid memory configuration comprises a dynamic random access memory tier and one or more nonvolatile random access memory tiers.

8. The method of claim 7, wherein the one or more nonvolatile random access memory tiers comprise a local nonvolatile random access memory tier and a remote nonvolatile random access memory tier.

9. The method of claim 7, wherein the one or more nonvolatile random access memory tiers comprise a global nonvolatile random access memory tier.

10. The method of claim 1, wherein each of the first data shuffle memory pool and the second data shuffle memory pool comprise a global shared memory tier.

11. The method of claim 1, wherein data in the data set is characterized by the data shuffle writer node as one or more of: data to be transmitted to the data shuffle reader node; data to be infrequently locally accessed; and data to be sorted and aggregated as one or more extents.

12. The method of claim 1, wherein the portion of the data set transmitted from the first data shuffle memory pool to the second data shuffle memory pool is transferred using remote direct memory access.

13. The method of claim 1, wherein the portion of the data set to be transmitted is sorted in the data shuffle writer node based on one or more memory ranges associated with the data shuffle reader node.

14. The method of claim 1, wherein the distributed data processing system comprises a MapReduce processing framework, and wherein the data shuffle writer node comprises a mapper node and the data shuffle read node comprises a reducer node.

15. A distributed data processing system, comprising:
   a plurality of nodes wherein at least one node is configured as a data shuffle writer node and at least another node is configured as a data shuffle reader node, wherein:
   the data shuffle writer node is configured to maintain a first data shuffle memory pool;
   the data shuffle reader node is configured to maintain a second data shuffle memory pool; and further wherein:
   the data shuffle writer node is configured to perform an in-memory compression on at least a portion of a data set from the first data shuffle memory pool;
   the data shuffle writer node is configured to perform a data shuffle operation on at least a portion of the compressed data from the first shuffle memory pool, wherein the data shuffle operation maps different parts of the compressed data for transmission to different nodes of the distributed data processing system; and the data shuffle writer node, in response to the data shuffle operation, is configured to transmit the at least a portion of the compressed data from the first data shuffle memory pool to the second data shuffle memory pool in a peer-to-peer manner;

wherein the distributed data processing system is implemented via one or more processing devices.

16. The system of claim 15, wherein performance of the in-memory compression is triggered by a given policy, and wherein the given policy is based on a memory pressure associated with a memory capacity threshold or a ratio of incoming write speed to outgoing read speed.

17. The system of claim 15, wherein each of the first data shuffle memory pool and the second data shuffle memory pool comprise a hybrid memory configuration.

18. The system of claim 15, wherein the portion of the data set transmitted from the first data shuffle memory pool to the second data shuffle memory pool is transferred using remote direct memory access.

19. The system of claim 15, wherein the distributed data processing system comprises a MapReduce processing framework, and wherein the data shuffle writer node comprises a mapper node and the data shuffle read node comprises a reducer node.

20. A computer program product comprising a non-transitory processor-readable storage medium having stored therein program code of one or more software programs, wherein the program code when executed by one or more processing devices of a distributed data processing system causes said one or more processing devices to:

maintain a first data shuffle memory pool at a data shuffle writer node and a second data shuffle memory pool at a data shuffle reader node, wherein the data shuffle writer node and the data shuffle reader node are part of a set of multiple nodes of the distributed data processing system;

perform an in-memory compression on at least a portion of a data set from the first data shuffle memory pool; and perform a data shuffle operation on the at least a portion of the compressed data from the first shuffle memory pool, wherein the data shuffle operation maps different parts of the compressed data for transmission to different nodes of the distributed data processing system; and transmit, in response to the data shuffle operation, the at least a portion of the compressed data from the first data shuffle memory pool to the second data shuffle memory pool in a peer-to-peer manner.

* * * * *